under vacuum so as to remove sorbed water. A measured quantity of the liquid alkali metal is introduced into the reaction vessel from the dispensing vessel while maintaining a vacuum or inert gas atmosphere in the reaction vessel. The mixture is stirred and, at the same time, heated to a temperature above the melting point, but below the boiling point, of the alkali metal. Suitable temperatures are from 1 to 650 centigrade degrees above the melting point of the alkali metal involved. Preferred operating temperatures are from 5 to 50 centigrade degrees above the melting point. The amount of time required for stirring varies with the quantities of each material in the mixture, for example, 30 minutes for a charge of 100 grams. In general, suitable times are from about ¼ to 2 hours. After the reaction is completed, the slurry of molten metal and particulate material so produced is subjected to the filtering action of a frit so as to remove the filtrable particulate material from the molten metal. The filtering operation is performed in a vacuum or in an inert atmosphere. The so-purified liquid alkali metal which passes through the frit is led into a recovery vessel which contains inert gas, if not evacuated, and allowed to cool. The remaining unreacted amphoteric oxide and the insoluble oxide produced by the aforesaid reaction remain on the frit. The pore size of the frit should be a bit smaller than the sige of the particles of the amphoteric oxide used.

3,287,109
OXYGEN REMOVAL FROM ALKALI METALS
Robert J. Moolenaar, Midland, Mich., assignor to The Dow Chemical Company, Midland, Mich., a corporation of Delaware
No Drawing. Filed May 31, 1963, Ser. No. 284,342
10 Claims. (Cl. 75—66)

This invention relates to a method of removing oxygen from alkali metals and, more particularly, to a method of removing dissolved alkali metal oxide from the liquid alkali metal by reacting the dissolved alkali metal oxide with an amphoteric oxide to form a compound which can be separated from the liquid alkali metal.

Oxygen-free alkali metals are recognized as useful materials for various purposes, including, for example, cooling nuclear reactors. In such uses, the coolant must be free from dissolved alkali metal oxides, which, if present in the liquid alkali metal, would be corrosive to the materials of construction of the nuclear reactor. Another use for oxygen-free alkali metals, e.g., cesium, is illustrated when cesium is used in conjunction with a thermionic converter. In these converters, the oxide-free cesium gas is used to produce a neutral conducting gas phase between two electrodes. Still a further use for an oxygen-free alkali metal, e.g., cesium, resides in the operation of a turbine. Cesium vapor is used to drive the turbine. The high boiling point of pure cesium and thus the high temperature operation of the turbine makes for a great increase in thermodynamic efficiency over turbines now generally known in the art. Again, dissolved oxides of cesium would be highly corrosive with obvious harmful effects.

The methods of preparation of oxygen-free alkali metals (or the removal of oxygen therefrom) heretofore known include cold trapping, hot trapping, slagging and distillation. These methods have the disadvantage of being either too costly for commercial operation or ineffective to remove substantially all the oxygen.

An object of the present invention is to provide a feasible and effective process for removing dissolved alkali metal oxide from liquid alkali metal.

Another object of the present invention is to provide a method for removing dissolved alkali metal oxide from liquid alkali metal wherein the temperatures used to accomplish this method are just above the melting point of the pure alkali metal.

These and other objects and advantages will be apparent from reading the detailed description presented hereinafter.

The term "inert gas atmosphere" as used herein means an atmosphere wherein substantially no oxidation of free liquid alkali metal takes place. Such an atmosphere in effect, is provided by a low absolute atmospheric pressure, i.e. an evacuated system or a vacuum, wherein that amount of air or oxygen in contact with the free alkali metal is not sufficient to give detrimental additional oxidation or by use of an inert atmosphere such as argon, for example.

In general, in carrying out the method of this invention, a dehydrated comminuted amphoteric oxide is mixed while under a vacuum or inert gas atmosphere with the liquid alkali metal from which the oxygen is to be removed. In the ensuing reaction, the amphoteric oxide takes up the oxygen from the alkali metal forming a slurry with the molten metal. The slurry so obtained is then filtered. Any unreacted amphoteric oxide and the insoluble oxide produced by the aforesaid reaction remain on the filter. Purified liquid alkali metal passes through the filter and is collected.

More specifically, the following procedure is illustrative of a mode of carrying out the method of the invention.

The treatment of the alkali metal with the amphoteric oxide is conveniently carried out in a suitable reaction vessel fitted with stirring means and a passageway connected to a dispensing vessel in which the alkali metal to be treated can be stored in molten condition and delivered to the reaction vessel as needed. Amphoteric oxide is introduced into the reaction vessel and heated under vacuum so as to remove sorbed water. A measured quantity of the liquid alkali metal is introduced into the reaction vessel from the dispensing vessel while maintaining a vacuum or inert gas atmosphere in the reaction vessel. The mixture is stirred and, at the same time, heated to a temperature above the melting point, but below the boiling point, of the alkali metal. Suitable temperatures are from 1 to 650 centigrade degrees above the melting point of the alkali metal involved. Preferred operating temperatures are from 5 to 50 centigrade degrees above the melting point. The amount of time required for stirring varies with the quantities of each material in the mixture, for example, 30 minutes for a charge of 100 grams. In general, suitable times are from about ¼ to 2 hours. After the reaction is completed, the slurry of molten metal and particulate material so produced is subjected to the filtering action of a frit so as to remove the filtrable particulate material from the molten metal. The filtering operation is performed in a vacuum or in an inert atmosphere. The so-purified liquid alkali metal which passes through the frit is led into a recovery vessel which contains inert gas, if not evacuated, and allowed to cool. The remaining unreacted amphoteric oxide and the insoluble oxide produced by the aforesaid reaction remain on the frit. The pore size of the frit should be a bit smaller than the sige of the particles of the amphoteric oxide used.

The process can be carried out in either a batch or a continuous operation. The relative advantages of these general techniques depend mostly upon the scale of production involved. The reaction time, that is, the time which would be employed in the typical batch or cyclic-type of operation, varies with the reactants and operating conditions as aforesaid. The reaction temperature used should be above the melting point of the alkali metal and below that point where the alkali metal becomes corrosive to container materials or volatilizes. The minimum amount of amphoteric oxide required is the stoichiometric amount necessary to react with all the dissolved alkali metal oxide in the alkali metal. However, since the oxide produced by the reaction of the dissolved oxide and amphoteric oxide is a solid insoluble in the liquid alkali metal and so is the amphoteric oxide, it is very likely that in a reasonable length of time, only the surface of the amphoteric oxide participates in the reaction. Thus, a larger amount of finely divided amphoteric oxide should be used than that corresponding to stoichiometric amounts. The maximum amount of amphoteric oxide is determined by the amount of pure alkali metal loss which can be tolerated. This loss is caused by the physical adherence of liquid alkali metal to the amphoteric oxide and which, therefore, cannot be filtered out. For example, in the removal of cesium oxide from cesium by addition of powdered aluminum oxide, it appears about 12 grams of aluminum oxide per gram of cesium oxide present would be a reasonable minimum. However, the preferred range would probably be above 100 grams of aluminum oxide (—200 mesh) per gram of cesium oxide present to a maximum of about 400 grams of aluminum oxide per gram of cesium oxide present.

In practicing this invention, it is possible to remove dissolved alkali metal oxides from the respective metals for all the alkali metals using aluminum oxide. Other amphoteric oxides can be used provided they do not react with the free alkali metal. The more desirable of these amphoteric oxides include zirconium oxide, titanium oxide, manganese oxide and ferric oxide.

The following examples will serve to illustrate further the method of the present invention but are not meant to limit it thereto.

*Example 1*

Five grams of aluminum oxide in particles of about one micron average radius were introduced into a reaction flask provided with a stirring bar capable of being activated by an external movable magnet. The flask was connected to another vessel as a dispensing means for the molten alkali metal to be treated, e.g., a glass vessel having an outlet pipe and a stop-cock at one end connected to the reaction flask so as to permit controlled flow of molten alkali metal from the vessel to the reaction flask. An opening was provided at the other end and fitted with a closure through which to load the vessel. The system comprising the flask, vessel and connecting pipe was evacuated and heated to about 300° C. to remove sorbed water from the aluminum oxide. Ten grams of liquid cesium containing 0.32 percent by weight cesium oxide was then introduced into the flask from the glass vessel by opening the stopcock. The contents of the reaction flask were stirred at 40° C. for one-half hour by operating the stirring bar with the magnetic activator. Stirring was continued for 30 minutes. The resulting slurry of liquid cesium, aluminum oxide and cesium aluminate was poured onto a glass frit of a filtering system having a recovery vessel under the frit, the transfer being effected in a vacuum. Argon was then introduced into the reaction flask to replace the vacuum therein while a vacuum was maintained in the recovery vessel so that purified liquid cesium was thereby forced to pass through the frit into the recovery vessel.

The cesium so obtained was then analyzed for cesium oxide and but 0.07 percent was found to be present.

Analysis of the cesium also indicated that less than three parts per million of aluminum (not present before the treatment) was introduced into the cesium.

*Example 2*

The procedure of Example 1 was repeated with cesium, having a concentration of cesium oxide of 0.11 percent. As a result of the treatment, the cesium oxide content was reduced to 0.02 percent.

Various modifications can be made in the method of the present invention without departing from the spirit and scope thereof and it is understood that I limit myself only as defined in the appended claims.

What is claimed is:

1. The process of removing an alkali metal oxide dissolved in a liquid alkali metal comprising reacting the dissolved alkali metal oxide with a dehydrated comminuted amphoteric oxide which will not react with the liquid alkali metal, while under an inert atmosphere, at a temperature above the melting point but below the boiling point of the alkali metal, and then recovering the so-purified liquid alkali metal.

2. The process of removing an alkali metal oxide dissolved in a liquid alkali metal in accordance with claim 1 wherein a comminuted amphoteric oxide in an amount exceeding the stoichiometric amount necessary to react with all the dissolved alkali metal oxide is used.

3. The process of removing alkali metal oxides dissolved in liquid alkali metals in accordance with claim 1 wherein the amphoteric oxide used is aluminum oxide.

4. The process of removing alkali metal oxides dissolved in liquid alkali metals in accordance with claim 1 wherein the amphoteric oxide used is zirconium oxide.

5. The process of removing alkali metal oxides dissolved in liquid alkali metals in accordance with claim 1 wherein the amphoteric oxide used is manganese oxide.

6. The process of removing alkali metal oxides dissolved in liquid alkali metals in accordance with claim 1 wherein the amphoteric oxide used is titanium oxide.

7. The process of removing alkali metal oxides dissolved in liquid alkali metals in accordance with claim 1 wherein the amphoteric oxide used is ferric oxide.

8. The process of removing an alkali metal oxide dissolved in a liquid alkali metal in accordance with claim 1 wherein the dissolved alkali metal oxide is reacted with the comminuted amphoteric oxide at a temperature of from 1 to 650 centigrade degrees above the melting point of the pure alkali metal.

9. A process in accordance with claim 8 in which the temperature is from 5 to 100 centigrade degrees above the melting point.

10. The process of removing an oxide of cesium metal dissolved in liquid cesium comprising reacting the dissolved cesium oxide with dehydrated comminuted aluminum oxide at a temperature of from 1 to 650 centigrade degrees above the melting point of cesium while under an inert gas atmosphere and then separating from the resulting mixture the liquid cesium so treated.

References Cited by the Examiner

UNITED STATES PATENTS

| | | | |
|---|---|---|---|
| 2,535,536 | 12/1950 | Hagmaier | 75—93 |
| 2,810,635 | 10/1957 | Cooper | 75—66 |
| 2,815,277 | 12/1957 | Bruggeman | 75—66 |

OTHER REFERENCES

Hoffman: The Solubility of Nitrogen and Oxygen in Lithium and Methods of Lithium Purification, Oak Ridge National Laboratory, U.S. Atomic Energy Comm., ORNL–2894, March 17, 1960.

Kroll: Present and Potential Uses of Sodium in Metallurgy, Handling and Uses of the Alkali Metals, p. 138, Advances in Chemistry #19, American Chemical Society, 1957.

DAVID L. RECK, *Primary Examiner.*

H. W. CUMMINGS, H. W. TARRING,
*Assistant Examiners.*